United States Patent Office 3,790,598
Patented Feb. 5, 1974

3,790,598
PROCESS FOR PREPARING α-AMINO ACIDS
Ralph A. Damico, Colerain Township, Hamilton County, and Robert G. Laughlin, Springfield Township, Hamilton County, Ohio, assignors to The Procter & Gamble Company, Cincinnati, Ohio
No Drawing. Filed Dec. 19, 1969, Ser. No. 886,748
Int. Cl. C07c 99/00, 101/00
U.S. Cl. 260—326.14 T     15 Claims

ABSTRACT OF THE DISCLOSURE

Process for preparing α-amino acids comprising reacting an isocyano acetate ester or salt with a strongly basic metalating agent to provide an α-metalated isocyano ester or salt carbanion, reacting said α-metalated isocyano ester or salt carbanion with an electrophilic reagent to provide an α-substituted isocyano acetate ester or salt; and thereafter hydrolyzing said α-substituted isocyano ester or salt to provide an α-amino acid.

BACKGROUND OF THE INVENTION

This invention relates to a method of synthesizing α-amino acids. α-Amino acids are well known compounds having been described in the literature for many years. Generally, α-amino acids have the following generic formula:

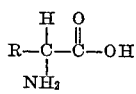

These acids are referred to as α-amino acids because they are characterized by having an amino moiety attached to the nearest carbon atom adjacent to the carboxylic acid moiety. The specific α-amino acid is determined by the substituent R, also attached to the α-carbon atom.

α-Amino acids have a wide variety of utilities. By far, the most notable utility of a small group of α-amino acids is that they form the building blocks of protein. A small group of α-amino acids comprising about 26 of said α-amino acids are known to be protein precursors in that the building of particular body proteins cannot be accomplished without utilization of these α-amino acids.

It is believed that about 26 different amino acids have been demonstrated to occur in the body protein tissues. All possess in common a primary amino substituent and a hydrogen atom attached to the α-carbon atom, as well as a carboxylic acid moiety. The 26 natural occurring α-amino acids found in proteins are as follows: glycine, alanine, valine, leucine, isoleucine, serine, threonine, lysine, 5-hydroxylysine, arginine, aspartic acid, asparagine, glutamic acid, glutamine, cystine, methionine, phenylalanine, tyrosine, 3:5-dibromotyrosine, 3:5-diiodotyrosine, triiodothyronine, thyroxine, proline, hydroxyproline, tryptophan, and histidine. Of the above-listed 26 α-amino acids contained in body protein tissue, 18 are readily manufactured by the body; however, 8 of these 26 are not manufactured by the body and therefore must be ingested by man. The 8 amino acids which must be ingested are referred to as essential amino acids. These 8 are: valine, leucine, isoleucine, methionine, phenylalanine, threonine, lysine, and tryptophan.

Often the nutritional value of food materials taken into the human body is determined by the presence or lack of presence of some of the 8 essential amino acids. Of the 8 essential amino acids, valine, leucine, isoleucine, and phenylalanine are readily available in vegetable protein and therefore readily available natural sources of these four exist.

However, methionine, threonine, lysine, and tryptophan, all of which are essential amino acids, are notably lacking in vegetable protein and therefore must be prepared and added to food materials in order to insure the proper body balance of these α-amino acids. Heretofore no adequate or practicable generally applicable commercial method of synthesizing the essential α-amino acids has existed.

The process of this invention is a method of synthesizing the eight essential α-amino acids as well as all other useful α-amino acids. The process is practicable in that reasonably high yields (i.e. often above 60%) are obtained in the three-step process of this invention.

While the majority of the above description has been with reference to the 26 α-amino acids naturally occurring in protein, there are other α-amino acids such as 3,4-dihydroxyphenylalanine, α-amino dodecanoic acid, citrulline, homoserine, and α-amino pimelic acid. These other α-amino acids have utilities varying from surfactants to medicinal treatment for Parkinson's disease. The process of this invention, as heretofore mentioned, has general applicability to a method of making any α-amino acid including the 26 α-amino acids naturally occurring in protein as well as other α-amino acids such as those previously mentioned.

SUMMARY OF THE INVENTION

The method of the present invention comprises a process of preparing α-amino acids of the formula:

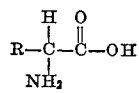

and of preparing proline and hydroxyproline, said method comprising the steps of (I) Reacting an isocyano acetate ester or salt with a strongly basic metalating agent to form a metalated isocyano acetate ester or salt carbanion;

(II) Reacting said metalated isocyano acetate ester or salt carbanion with an electrophilic agent selected from the group consisting of organic halides of the formula RX, said R group being selected to represent the α-R group moiety of said α-amino acid, and aldehydes having the formula R'CHO where it is desired that R in said α-amino acid have the formula

the product of said reaction being an α-substituted isocyano acetate ester or salt; and thereafter;

(III) Hydrolyzing said α-substituted isocyano acetate ester or salt to provide an α-amino acid.

DETAILED DESCRIPTION OF THE INVENTION

As heretofore briefly mentioned, the object of the process of this invention is to prepare by a practicable method providing reasonably high yields, i.e. often 60% or greater, α-amino acids having the general formula:

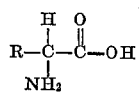

and of preparing proline and hydroxyproline. Proline and hydroxyproline are specifically mentioned because both of these α-amino acids contains —NH groups as opposed to $NH_2$ and have a cyclic moiety attached to the nitrogen atom and the α carbon atom and therefore do not exactly fit within the above, otherwise generic, formula.

As will be seen from the hereinafter described second process step, the specific value of R in the above α-amino acid generic formula is determined by the electrophilic agent employed; in other words, the precise α-amino acid prepared is determined by the R group of an electrophilic agent having the formula RX or R'CHO. This relationship will be described in detail with the second step of the process of this invention.

The first step of the process of this invention may be summarized by the following equation (step I):

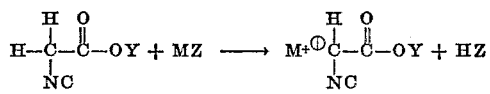

In simple word description, the step I equation describes reacting an isocyano acetate ester or salt with a strongly basic metalating agent to form a metalated isocyano acetate ester or salt carbanion. The isocyano acetate ester or salt starting material for the step I process has the empirical formula

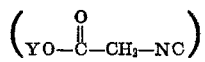

Whether the isocyano acetate starting material is an ester or a salt is determined by the exact value of Y. For example, if Y is an alkyl group, then the starting material is an isocyano acetate ester; on the hand, if Y is an alkali metal ion, then the starting material is an isocyano acetate salt.

No criticality exists in regard to the Y group moiety of the isocyano acetate compound. As will be more readily apparent from the detailed description of step III, hereinafter given, no criticality exists with regard to the structure of the Y constituent because ultimately the Y moiety is hydrolyzed away from the remaining portion of the compound. However, it is important that Y be a readily hydrolyzable moiety. In general, Y can be selected from the following group of radicals: alkyl groups, substituted alkyl groups, aryl groups, substituted aryl groups, and group I metal ions. The alkyl or aryl groups, either substituted or unsubstituted, can be normal or branched chain. It is preferred that Y be a $C_1$-$C_{20}$ normal or branched chain alkyl group, and it is especially preferred that Y be a $C_1$-$C_4$ normal or branched chain alkyl group. The reason for the special preference for $C_1$-$C_4$ alkyl groups is their easy availability and the fact that $C_1$-$C_4$ isocyano acetate esters are readily soluble in the solvents or diluents preferably utilized in this step, as hereinafter explained. It is also preferred that the starting material in step I be an isocyano acetate ester as opposed to an isocyano acetate salt.

Isocyano acetate esters and salts are presently not readily available on the commercial market and therefore the starting material must itself be synthesized by a rather simple synthesis procedure which is described in detail in an article appearing in Angewante Chemie, International Edition, vol. 4, pp. 472-485 (1965) where a specific synthesis of ethyl isocyano acetate is shown. This article is incorporated herein by reference and therefore a detailed description of the synthesis of the starting material isocyano acetate ester or salt will not be given herein; however, a brief synopsis of the overall reaction will be given. In the first step, glycine is reacted with formic-acetic anhydride in the presence of small amounts of formic acid to yield N-formylglycine. In the second step, the N-formylglycine product of the first step is oxygen alkylated by a combination of ingredients, comprising, for example, an alkyl sulfate and potassium hydroxide. The reaction is conducted in the presence of alcohol and the final reaction product is an ester of N-formylglycine. In the third and final step of the isocyano acetate ester synthesis, the ester of N-formylglycine prepared in step 2 is reacted with phosgene in the presence of triethylamine to yield an isocyano acetate ester. This 3-step synthesis may be summarized by the following equations:

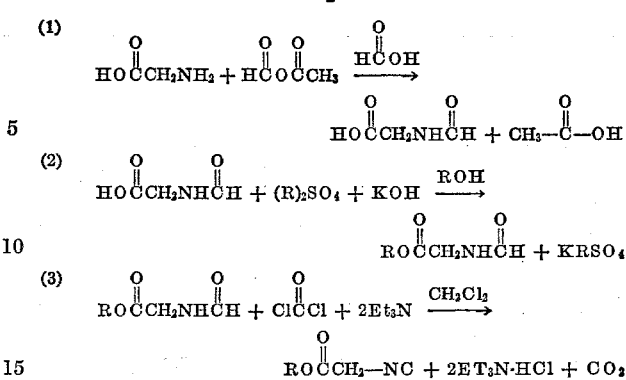

Isocyano acetate salt synthesis is the same as above except the ester product of the third equation is saponified with an alkali base.

For other literature references showing step (1), see the Journal of Organic Chemistry, vol. 26, pp. 4698-4701 (1961) which is incorporated herein by reference. For additional literature reference showing the oxygen alkylation of step (2), see Reagents for Organic Synthesis, p. 682, published by John Wiley & Son, Inc., 1968, which is incorporated herein by reference.

Again referring to the Step 1 equation shown above, the isocyano acetate ester or salt is reacted with a strongly basic metalating agent of the formula MZ to provide a metalated isocyano acetate ester or salt carbanion plus a by-product represented as HZ. Depending upon the particular strongly basic metalating agent employed, the by-product, HZ, is hydrogen gas, as is the case with an alkali metal or an alkali metal hydride, or is an alkane, an alkanol, an aromatic hydrocarbon, or an aralkane.

In the formula "MZ," M represents a metal and Z represents the remaining portion of the strong base formula.

The alkali metal containing strong bases which effect removal of a hydrogen atom from a carbon atom adjacent to an isocyanide moiety of an isocyano acetate ester or salt to form a metalated isocyano acetate ester or salt carbanion, are selected from the group consisting of alkali metals (e.g., sodium, potassium, lithium, and cesium); alkali metal hydroxides (e.g., sodium hydroxide); alkali metal oxides (e.g., sodium oxide, potassium oxide); alkali metal hydrides (e.g., sodium hydride, potassium hyride, lithium hydride); alkali metal alkyls wherein the alkyl group contains from 1 to 12 carbon atoms (e.g., methyl sodium, ethyl potassium, n-propyl lithium, 2-ethylhexyl sodium; n-dodecyl lithium); alkali metal alkoxides of the formula BOM, wherein B is an alkyl group containing from 1 to 4 carbon atoms and M is a metal ion (e.g., sodium methoxide, sodium ethoxide, potassium n-butoxide); alkali metal aryls wherein the aryl group contains from 6 to 14 carbon atoms (e.g., phenyl sodium, 2-naphthyl sodium, 9-anthracyl lithium); and alkali metal aralkyls wherein the aralkyl group contains from 7 to 15 carbon atoms (e.g., benzyl potassium, 3-phenylpropyl sodium, 2-naphthylmethyl lithium, 2-phenylpropyl lithium).

Preferred strongly basic metalating agents of the formula MZ are those which enable production of the metalated isocyano acetate carbanion salts in a pure form by evolving a gas which may be collected. Alkali metal hydrides, and alkyls are examples of such materials, hydrogen and alkane gases being the side reaction products. The alkali metal hydrides are especially preferred, both from the standpoint of facility in undergoing reaction and ready commercial availability. Also, highly preferred as metalating agents are the alkali metal alkoxides. These are especially preferred metalating agents because the reaction proceeds easily at room temperature and the resulting carbanion is very stable in the alcoholic medium.

The α-metalated isocyano acetate ester or salt carbanions prepared in the step I reaction are prepared as a result of reacting an isocyano acetate ester or salt and a strongly basic metalating agent at a temperature of from about −70° C. to 150° C., preferably at from −40° C. to 80° C. Normally the reaction is effected in from .5 hour to about 24 hours, and preefrably from about .5 hour to 2 hours. If temperatures above 150° C. are employed the α-metalated isocyano acetate carbanion is no longer stable and at temperatures below −70° C., the reaction time is so slow as to be impractical, and moreover, if a solvent is employed, the solvent may freeze.

It should be further noted that when a gaseous byproduct is evolved it is normally convenient to conduct the reaction until such evolution of gas ceases.

The reaction is normally carried out at about room temperature (20°–25° C.), which is especially preferred. In fact there is really little or no advantage to conducting the reaction at elevated temperatures.

The amount of strongly basic metalating agent employed in effecting the production of an α-metalated isocyano acetate ester or salt carbanion is not a critical aspect of the present invention. While some product forms when a small amount of base is employed, relative to the isocyano acetate ester or salt, at least about 0.5 mole of base per mole of ester or salt should normally be employed for satisfactory yields. Since the reaction of an isocyano acetate ester or salt and a strongly basic metalating agent is a stoichiometric one, a substantially equal molar amount of base per mole of the isocyano acetate ester or salt is preferred for best yields. While there is no upper limit to the amount of base which may be employed, practical considerations are such that it is generally uneconomical to exceed about 10 moles of strong base per mole of the isocyano acetate ester or salt employed. In addition, amounts in excess of about 10 moles of base per mole of isocyano acetate ester or salt tend to result in the undesirable formation of carbanion salts having both hydrogens on carbon atoms adjacent to the isocyano acetate moiety replaced by alkali metal atoms.

Normally, the reaction is conducted by adding a solution or suspension of the isocyano compound to the strongly basic metalating agent or a solution or suspension of the strongly basic metalating agent. Alternatively, the strongly basic metalating agent or a solution or suspension thereof can be added to the isocyano acetate compound. For best yields, however, and for economy of operation, it is best to conduct the reaction in the presence of a solvent or diluent. However, the use of a solvent or diluent is not a critical aspect of the present invention but does constitute a preferred embodiment. When a solvent or diluent is employed it should be a solvent which is essentially nonreactive, that is, one which will not detrimentally affect the preparation of the desired isocyano acetate carbanion. The use of solvents having acidic hydrogens, i.e. mineral acids and carboxylic acids and $H_2O$, are unsuitable since these solvents will react with the strongly basic metalating agent. Therefore, the solvent must be a non-protic solvent.

Suitable solvents are to be found in such classes of compounds as the aliphatic, aromatic, or mixed aliphatic-aromatic ethers, cyclic ethers, and alcohols. Among the ether compounds which are suitable as solvents are diethyl ether, dibutyl ether, anisole, diphenyl ether, tetrahydrofuran, 1,2-dimethoxyethane and diethylene glycol dimethyl ether. Methanol, ethanol, propanol, and butanol are examples of suitable alcohol-type solvents. When alcohols, such as those listed herein are employed as solvents it is preferred that the metalating agent be an alkoxide. Still other solvents which are suitable are nitriles such as acetonitrile.

Depending upon the solvent employed, the isocyano acetate ester or salt carbanion prepared in the step I process reaction may be stable at temperatures as high as about 150° C. for periods up to approximately 24 hours. Normally, it is inconvenient and unnecessary to isolate the carbanion salts prepared in accordance with the step I reaction as the carbanions are employed merely as intermediates in the preparation of α-amino acids by subsequent reaction with an electrophilic agent as hereinafter described. Preferably, the subsequent reaction with an electrophilic agent is effected in the same reaction vessel as used in the preparation of the carbanion by employing as the reactant the solution of the organic solvent and isocyano acetate carbanion salt.

While conducting the step I reaction procedure, it is preferred that the reaction vessel be continuously flushed with an inert gas such as nitrogen in order to insure that the strongly basic metalating agent such as, for example, butyl lithium, is not excessively oxidized by contact with air such that the strongly basic metalating agent might be rapidly oxidized and burst into flame.

The second step of the process of this invention can be conveniently summarized by the following equation (step II):

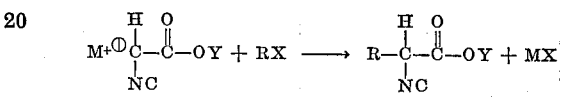

In word descriptions, during step II the α-metalated isocyano acetate ester or salt carbanion is reacted with an electrophilic agent, here an organic halide, represented by the formula RX to yield an α-substituted isocyano acetate ester or salt, plus as a by-product a salt represented by MX. Broadly, the phrase "electrophilic agent" is used herein to define a compound which has a tendency to seek electrons, or in other words, a compound which will react with a carbanion.

As previously indicated in the summary of the invention where it is desired that the R moiety in the α-amino acid have a hydroxy group attached thereto, i.e. have the formula

then the electrophilic reagent is an aldehyde and the step II equation becomes:

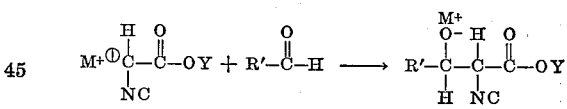

The reaction conditions and hydrolysis as shown in step III are conducted in the same manner as described for using organic halides as electrophilic reagents and therefore no separate description will be given herein.

The exact compounds represented by RX and R'CHO in the step II equations, have no generic definitive structural similarities but can with few exceptions broadly be classified into two classes. In the first class are organic halides such as alkyl halides (e.g. methyl iodide), and aralkyl halides, such as benzyl chloride. The second broad class of electrophilic agents suitable for utilization in the step II equation are aldehydes such as formaldehyde and acetaldehyde. In the instance of the second class of compounds, there is no halogen atom associated with an alkyl group.

The exact electrophilic agent utilized in any specific α-amino acid synthesis depends upon the particular amino acid being synthesized. In other words, in looking at the step II equations given previously herein, the value of R will be determined by the particular desired α-amino acid. Accordingly, the value of R in RX will be selected such that R is the desired R moiety for the particular α-amino acid desired. Likewise the value of R' will be selected such that the specific R group, having a hydroxyl moiety attached thereto, is obtained. Such a selection can be readily determined by a skilled chemist.

For example, the table below lists suitable electrophilic agents, shown in the step II equation as RX and R'—CHO, for making of specific α-amino acids.

TABLE

| Class | Amino acid | Electrophilic reagents | Structure |
|---|---|---|---|
| I. Aliphatic: | | | |
| A. Monoaminomonocarboxylic acids | Alanine | Methyl halide | $CH_3X$ |
| | Valine | Isopropyl halide | $(CH_3)_2CHX$ |
| | Leucine | Isobutyl halide | $(CH_3)_2CHCH_2X$ |
| | Isoleucine | Secondary butyl halide | $CH_3CH_2\underset{\underset{CH_3}{\mid}}{C}HX$ |
| | Serine | Formaldehyde | $H\overset{\overset{O}{\|}}{C}H$ |
| | Threonine | Acetaldehyde | $CH_3\overset{\overset{O}{\|}}{C}H$ |
| B. Diaminomonocarboxylic acids | Lysine | 4-aminobutyl halide | $H_2NCH_2CH_2CH_2CH_2X$ |
| | 5-hydroxylysine | 3-hydroxy-4-amino butyl halide | $H_2NCH_2\underset{\underset{OH}{\mid}}{C}HCH_2CH_2X$ |
| | Arginine | Guanidino propyl halide | $H_2N\overset{\overset{NH}{\|}}{C}NHCH_2CH_2CH_2X$ |
| C. Monoaminodicarboxylic acids and amides thereof | Aspartic acid | Haloacetic acid | $HO_2CCH_2X$ |
| | Asparagine | Haloacetamide | $H_2N\overset{\overset{O}{\|}}{C}CH_2X$ |
| | Glutamic acid | 3-halopropionic acid | $HO_2CCH_2CH_2X$ |
| | Glutamine | 3-halopropionamide | $H_2N\overset{\overset{O}{\|}}{C}CH_2CH_2X$ |
| D. Sulfur-containing amino acids | Cysteine and cystine | Halomethyl mercaptan | $H\text{---}S\text{---}CH_2X$ |
| | Methionine | 2-haloethylmethyl sulfide | $CH_3SCH_2CH_2X$ |
| II. Aromatic amino acids | Phenylalanine | Benzyl halide | $C_6H_5\text{---}CH_2X$ |
| | Tyrosine | 4-hydroxybenzyl halide | $HO\text{---}C_6H_5\text{---}CH_2X$ |
| | 3,5 dibromotyrosine | 3,5-dibromo-4-hydroxy benzyl halide |  |
| | 3,5 diiodotyrosine | 3,5-diiodo-4-hydroxy benzyl halide |  |
| | Triiodothyronine (3:5:3′) | 2,6,3′-triiodo-4-halomethyl 4′-hydroxydiphenylether | 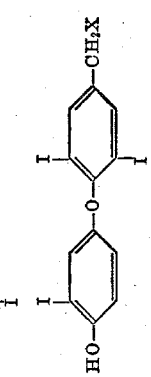 |

TABLE—Continued

| Class | Amino acid | Electrophilic reagents | Structure |
|---|---|---|---|
| | Thyroxine | 2,6,3',5'-tetraiodo-4-halomethyl 4'-hydroxydiphenylether | HO—⟨phenyl⟩—O—⟨phenyl⟩—CH$_2$X |
| III. Heterocyclic amino acids | Proline | 1,3-dihalo propane | X—CH$_2$CH$_2$CH$_2$—X |
| | Hydroxyproline | 1,3-dihalo-2-hydroxy propane | X—CH$_2$CHOH—CH$_2$X |
| | Tryptophan | Gramine | ⟨indole⟩—CH$_2$N(CH$_3$)$_2$ |
| | Histidine | 4-halomethyl imidazole | ⟨imidazole⟩—CH$_2$X |

It will be appreciated, of course, that the electrophilic agents listed in the table are listed by way of example only and are not intended as limiting the scope of the present invention. Inasmuch as any electrophilic reagent capable of being attacked by a carbanion may be employed as long as the precise electrophilic agent is selected to give the desired α-amino acid; thus, the precise electrophilic agent employed is not considered a critical aspect of the present invention.

When electrophilic agents having acidic hydrogen atoms, e.g., electrophilic reagents having carboxylic acid moieties, phenolic moieties, amino moieties and alcoholic moieties are employed, the hydrogen atoms of the above described groups tend to be very reactive and unless the active hydrogen atom is replaced by a less reactive group, the electrophilic agent will react with the strong base rather than the desired reaction with the isocyano acetate ester or salt. The group utilized to replace the active hydrogen atom is referred to in the art as a "protective group."

In the table, protective groups are not shown on the electrophilic reagents; however, it is to be understood that functional groups such as those above listed when appearing in the table must have their active hydrogens replaced with a suitable protective group in order to prevent undesirable side reactions. The protective group in every instance is hydrolyzed during the step III equation, explained hereinafter, to provide the original hydrogen atom.

As an example, in looking at the table with regard to preparation of lysine, the electrophilic agent shown is 4-aminobutyl halide; however, as explained above the hydrogen atoms of the amino group are reactive and, therefore, a suitable protective group such as an acyl group must be used to replace one of the hydrogen atoms. When the acyl protective group is acetyl, which is preferred for lysine, the protected electrophilic agent is 4-acetaminobutyl halide.

Suitable well-known protective groups are acyl, carbobenzoxy and t-butoxycarbonyl. For examples of other protective groups see Greenstein & Winitiz, Chemistry of the Amino Acids, vol. 2, John Wiley & Sons (1961), which is incorporated herein by reference.

As can be seen from the above table, the particular electrophilic reagent, represented in the step II equations by RX, and R'CHO utilized depends upon the particular class of amino acid being synthesized. For example, if the amino acid is an aliphatic amino acid, such as α-monoamino carboxylic acids, generally the reagent RX will be the appropriate alkyl halide. If the amino acid is a diamino monocarboxylic acid, such as lysine, the reagent will be a substituted amino halide. If the amino acid is a sulfur-containing amino acid such as cystine, the electrophilic reagent will be a halo alkyl sulfide. If the amino acid is an aromatic amino acid such as phenylalanine, a suitable reagent will be benzyl chloride or any other benzyl halide. If the amino acid has substituents on the R group which is adjoined to the α carbon atom, then of course the reagent RX will also have substituents contained on the relevant R moiety. Finally if the relevant R grouping has hydroxyl groups attached thereto such as in the case of serine, the electrophilic agent is an aldehyde such as formaldehyde.

It should be noted that in the case of tryptophan, the electrophilic agent can be gramine, which is neither an organic halide nor an aldehyde; the reagent can also be gramine methiodide.

Other electrophilic agents suitable for reacting with isocyanoacetate ester or salt carbanions to yield, upon hydrolysis as hereinafter explained, the corresponding α-amino acids are as follows:

|  | Electrophilic agent |
|---|---|
| Other aminodicarboxylic acids: | |
| α-Amino pimelic acid | 5-halo valeric acid. |
| β-Methyl aspartic acid | α Halo α' methyl acetic acid. |
| Other diaminomonocarboxylic acids: | |
| Ornithine | 3-halo propyl amine. |
| Citrulline | N-(3-halo propyl) urea. |
| Other aliphatic monoamino monocarboxylic acids: | |
| α-Amino valeric acid (norvaline) | Propyl halide. |
| α-Amino dodecanoic acid | Decyl halide. |
| α-Amino stearic acid | Hexadecyl halide. |
| α-Amino isoamyl acetic acid | Isoamyl halide. |
| α-Amino tert-butyl acetic acid (tert-leucine). | Tert-butyl halide. |
| α-Amino-ω-hydroxy acids: | |
| Homoserine | Ethylene oxide. |
| γ-Hydroxyornithine | 3-halo-2-hydroxy-propyl amine. |
| Ring-substituted α-amino acids: | |
| 3,4-dihydroxy phenylalanine (Dopa). | 3,4-dihydroxy benzyl halide. |
| p-Methylphenylalanine | p-Methyl benzyl halide. |
| 5-hydroxytryptophan | 5-hydroxy gramine. |
| β-Pyridylalanine | 2-pyridyl methyl chloride. |

The reaction of the carbanion salts of the α-metalated isocyano acetate ester or salt, as shown in step II, may be effected by reacting the carbanion salt with the electrophilic agent at a temperature of from about −70° C. to about 150° C. and preferably from −40° to 80° C.

While some product is formed when the amount of electrophilic agent employed is either small or large in relation to the amount of carbanion salt employed, as a practical matter it is uneconomical to use substantially more or less than about an equal amount of electrophilic agent and carbanion salt. A molar amount of electrophilic agent of from 0.5 to 10 per mole of carbanion salt is generally sufficient to form the desired product in satisfactory yield. Preferably, from 1 to 5 moles of electrophilic agent per mole of carbanion salt are employed.

When temperatures toward the lower end of the specified temperature range are employed, the reaction normally is effected in from about .5 hour to 24 hours, whereas shorter periods of time, i.e. from about .5 hour to 2 hours, are required when the reaction is effected at higher temperatures. A highly preferred operating range is at room temperature, i.e. 20–25° C. because the reaction proceeds with facility and in a practical amount of time in this temperature range.

Normally, the reaction of an isocyano acetate ester or salt carbanion and an electrophilic agent is effected by the addition of the electrophilic agent to the solution which results from the preparation of the carbanion salt. However, the carbanion salt solution can also be added to the electrophilic agent. Inasmuch as the α-metalated isocyano acetate ester or salt carbanion is an intermediate, it is generally not separated and is used without further modification for reaction with the electrophilic agent. Any order of mixing can be employed, this not being a critical aspect of the present invention so long as the requisite proportions of carbanion salt and electrophilic agent are allowed to react for a period of time within the specified range. Preferably the reaction is facilitated by continuous stirring during the addition of the electrophilic agent to the carbanion salt-solvent mixture. After the step II procedure, the α-substituted isocyano acetate ester or salt can be separated from the by-product MX—assuming the electrophilic agent is an organic halide, by filtration. During the filtration procedure the by-product MX is removed, leaving behind substantially pure α-substituted isocyano acetate ester or salt.

As mentioned previously in connection with steps I and II, no criticality exists with regard to the order of addition of reagents; in fact both the metalating agent and the electrophilic agent can be added to the solvent-isocyano acetate ester mixture at the same time and satisfactory yields of α-substituted isocyano acetate ester are produced. Adding the metalating agent and the electrophilic agent to the isocyanoacetate ester or salt concurrently is preferred from the standpoint of process efficiency.

The step III reaction procedure may be illustrated by the following equation (step III):

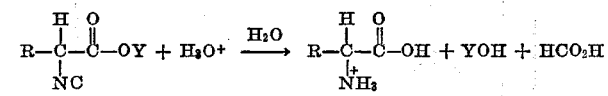

As can be seen from the above equation, the step III process is in reality a simple hydrolysis of the α-substituted isocyano acetate ester or salt to yield an α-amino acid plus by-products. In short, the α-substituted isocyano acetate esters or salts prepared in accordance with step II are readily converted to α-amino acids by hydrolyzing the ester or salt, whichever the case may be, with, for example, an inorganic mineral acid. Hydrochloric acid, mentioned by way of example herein, is useful for this purpose. It will be appreciated, however, that any of the common mineral acids normally employed to effect hydroylsis can be likewise employed herein.

The hydrolysis reaction is a simple stoichiometric reaction and accordingly the amount of acid necessary to hydrolyze the α-substituted isocyano acetate ester or salt can be readily calculated by using mole ratios. During hydrolysis, sufficient mineral acid is added to the α-substituted isocyano acetate ester or salt to make acid the solution such that the pH is less than 7. It is preferred that amounts slightly in excess of the stoichiometric amount be used in order to facilitate the rapidity of hydrolysis.

In regard to hydrolysis times, generally a time period of from 1 to 48 hours is sufficient and preferably from 1.5 to 3 hours. Hydrolysis is normally performed by refluxing the above-referred-to ester with the mineral acid solution for a time within the above-described time ranges. However, other means can be utilized in addition such as simply stirring the mineral acid and ester together for a period of time, or alternatively, stirring coupled with heating at a temperature lower than the boiling point. Normally, if the preferred method of refluxing is utilized, the refluxing temperature will be from 90° C. to 110° C.

After hydrolysis within the above-described time and temperature ranges has occurred, the α-amino acid can be separated from any excess mineral acid by neutralizing the acid to its isoelectric point with a base such as potassium or sodium hydroxide and thereafter lowering the temperature to 5° C. or thereabouts, at which point the amino acid crystallizes out of the solution usually a yield rate in excess of 60% of theoretical yield. For details in regard to purification of amino acids from mineral acid solutions thereof, see Greenstein & Winitz, Chemistry of the Amino Acids, vol. 3, John Wiley & Sons (1961), which is incorporated herein by reference. Other well-known separation techniques such as evaporation can also be employed. In short, no criticality exists with regard to the method of separating the α-amino acid from the acid solution utilized in hydrolyzing the acid.

While the above description has been given with specific reference to acid hydrolysis in step III, which is the preferred method, the hydrolysis can also be accomplished by using an alkali hydroxide basic hydrolysis in which case the reaction becomes:

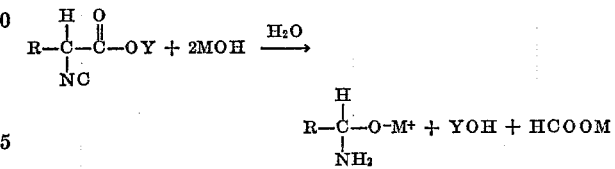

The α-amino acid salt is then neutralized with acid and separated as described above. Basic hydrolysis has been found to be especially preferred in preparing tryptophan because acid hydrolysis has a tendency to rupture the heterocyclic ring moiety present in the tryptophan structure.

The following examples are set forth to illustrate but not limit the invention described herein. In each of the examples the methyl isocyano acetate ester starting material was prepared in accord with the description hereinbefore given. More specifically, the preparation is as follows:

Preparation of N-formyl glycine (step 1, col. 4)

To 400 grams (5.33 moles) of glycine in a 3-neck 2-liter round bottom flask, 500 ml. of formic acid was added with stirring and the flask was heated to 100° C. to dissolve the glycine. In another 3-neck 2-liter round bottom flask was placed 554 ml. of acetic anhydride and 222 ml. of 97% formic acid to prepare 5.86 moles of formic-acetic anhydride. After stirring for .5 hour the latter solution was added dropwise via an addition funnel to the glycine solution. The contents of the flask were stirred for 17 hours, during which time a white precipitate formed. The mixture was filtered and the white crystals were washed with acetone. The filtrate was concentrated to approximately 100 ml. and a second crop of crystals was collected. The combined precipitates were dried under vacuum and weighed 480 g. Theoretical N-formyl glycine was 550 g. Yield was 87%.

Preparation of methyl N-formyl glycinate (step 2, col. 4)

75 g. (0.73 mole) of N-formyl glycine was dissolved in 400 ml. of methanol and neutralized to pH 8 with 45 g. of potassium hydroxide. This solution was placed into a 2-liter 3-neck round bottom flask equipped with an addition funnel, condenser and magnetic stirrer. 75 ml. (101 grams, 0.80 mole) of dimethyl sulfate was added dropwise to the stirred mixture and the resultant solution heated at reflux (~70° C.) for 17 hours. A precipitate of potassium methyl sulfate was formed and, after cooling, the mixture was filtered. Evaporation under vacuum gave 85 g. of unpurified methyl N-formyl glycinate. Theoretical methyl N-formyl glycinate was 85 grams. Yield was 100%.

Preparation of methyl isocyanoacetate (step 3, col. 4)

37.5 g. (0.29 mole) of methyl N-formyl glycine was mixed with 165 ml. (116 g., 1.14 moles) of triethylamine and 150 ml. of methylene chloride in a 500 ml. 3-neck flask equipped with a thermometer, Dry Ice condenser, gas inlet tube and magnetic stirrer. Phosgene was then bubbled through the reactor at a sufficient rate to maintain a temperature of 35–45° C. After 1.5 hours the reaction was stopped and the mixture poured into benzene to precipitate triethylamine hydrochloride. This was removed by filtration and the product, methyl isocyano acetate, recovered by evaporation under vacuum. A total of 29 g. of crude product (100% of theory) was found. This material was distilled at 40° C. and 1 mm. pressure to yield 18 g. (60%) of pure product.

EXAMPLE 1

Preparation of threonine from acetaldehyde and methyl isocyano acetate using sodium methoxide as the strongly basic metalating agent The reaction vessel was a 3-neck flask fitted with a thermometer, a condenser, and an addition funnel, as well as being equipped with a continuous magnetic stirring device. The entire reaction vessel was flushed with $N_2$ prior to the commencement of the reaction. 100 ml. of methyl alcohol was placed into the flask and 1.28 grams of sodium (.055 mole) was weighed into a beaker containing hexane. The sodium was removed from the hexane and dropped into the methyl alcohol which was continuously being stirred and which was maintained under a nitrogen blanket. 5 grams (.0505 mole) of methyl isocyano acetate was weighed into a beaker and diluted with monoglyme. Thereafter the monoglyme-methyl isocyano acetate mixture was syringed into the addition funnel and added slowly in a dropwise manner to the sodium-methyl alcohol mixture after the sodium and methyl alcohol had completely reacted at 40° C. to yield sodium methoxide. The methyl isocyano acetate and sodium methoxide strongly basic metalating agent mixture was allowed to react for 30 minutes at a temperature of 40° C. This completed step I. Thereafter 3.5 ml. of acetaldehyde was syringed into the addition funnel and added dropwise over several minutes to be metalated methyl isocyano acetate ester carbanion. Because the reaction was exothermic, the temperature in the reaction vessel rose 13° C. The reaction was allowed to continue overnight (15 to 16 hours) at a temperature of 40° C. This completed step II.

A 10 ml. aliquot portion of the reaction mixture was removed and heated for 2 hours at 90° C. with 4 ml. of concentrated hydrochloric acid and 12 ml. of water. The acidified aliquot was evaporated to near dryness. At this point thin layer chromatography was run on a small portion of the residue and indicated the presence of threonine. Thereafter the remaining portion of the acidified dried residue was dissolved in isopropanol and aniline was added until the pH was approximately 7. The solution was stirred for .5 hour. Thereafter the solution was filtered and 0.4 gram of a brown precipitate was obtained. Infrared analysis of the brown precipitate showed that it was threonine.

Thereafter the remaining portion of the acetaldehyde carbanion salt mixture was refluxed with 100 ml. of alcoholic hydrochloric acid (10 ml. of concentrated hydrochloric acid and 10 ml. of water and 80 ml. of methyl alcohol). The refluxing was continued for 45 hours at 90° C. The solution was thereafter filtered and the filtrate was concentrated on a rotary evaporator to a dark brown acidic residue. This residue was taken up in isopropanol and the pH was adjusted to 7 utilizing aniline as the base. At this point a large amount of white precipitate appeared. The precipitate was stored overnight at —5° C. and thereafter collected and dried under vacuum. Nuclear magnetic resonance analysis of the dried precipitate weighing 3.5 grams showed it consisted of only threonine. The total weight of threonine obtained, i.e. 3.5 grams plus the .4 gram from the previous aliquot portion, was 3.9 grams. Based upon stoichiometric calculations, the theoretical amount of obtainable threonine was 6.0 grams. The percentage of yield is 65%.

When in Example 1 the methyl isocyanate ester is replaced by the corresponding ethyl, propyl butyl, octyl, and benzyl esters, similar formation of threonine occurs at the same yield level. Similar results are also obtained when the starting material is sodium isocyano acetate.

EXAMPLE 2

Preparation of tryptophan from gramine methiodide and methyl isocyano acetate ester using sodium methoxide as the strongly basic metalating agent 1.3 grams (.055 mole) of freshly cut sodium was weighed into a 3-neck 500 ml. round-bottom flask containing 75 ml. of methyl alcohol. The 3-neck flask was fitted with a thermometer, a condenser, and an addition funnel, as well as being equipped with a continuous magnetic stirring device. The entire reaction vessel was flushed with a nitrogen atmosphere prior to commencement of the reaction. The sodium and methyl alcohol mixture was continuously strired for one hour, after which the formation of sodium methoxide was completed. Thus, in this instance the strongly basic metalating agent was sodium methoxide. Thereafter the temperature was raised to 40° C. by use of a constant temperature oil bath, after which 5 grams of methyl isocyano acetate (.05 mole) was added slowly dropwise by means of the additional funnel to the strongly basic sodium methoxide metalating agent. The reaction mixture was noted to immediately darken in color, indicating that the methyl isocyano acetate was reacting with the strongly basic metalating agent, i.e. sodium methoxide, to form an α-metalated isocyano acetate carbanion in accord with the step I equation.

After 30 minutes of continuous stirring, 17.55 grams of gramine methiodide (0.055 mole) was added to 300 ml. of methyl alcohol. The temperature was raised to 50° C. and the reaction was stirred for about 2 minutes.

A precipitate formed and after 35 minutes the solution was filtered from the precipitate. Formation of a precipitate indicated the step II reaction was probably occurring. The precipitate was dried in a vacuum desiccator and infrared analysis was run. The filtrate, containing the tryptophan ester, was concentrated by vacuum evaporation to about 80 ml. Approximately 20 grams of sodium hydroxide, along with 120 ml. of methyl alcohol, was added dropwise through the addition funnel, and the mixture was refluxed for 2 hours at 100° C. to complete a step III basic hydrolysis. Thereafter the reaction mixture was concentrated to dryness by vacuum evaporation. The residue was taken up in water and washed several times with chloroform to remove excess gramine. The washed water layer was concentrated to near dryness, and thin layer chromatography was run indicating the presence of triptophan, an α-amino acid having the formula

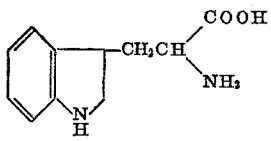

Substantially the same results are achieved when gramine is the electrophilic agent in that thin layer chromatography indicates the presence of tryptophan. Likewise, similar results are obtained when the steps I and II reactions are conducted at 23° C. In addition, the same results are obtained when the electrophilic agent and the methyl isocyanoacetate ester are added concurrently rather than sequentially as shown in this example.

EXAMPLE 3

Preparation of valine from methyl isocyano acetate ester and isopropyl bromide utilizing sodium hydride as the strongly basic metalating agent The same 3-necked round-bottom flask previously utilized in Examples 1 and 2 was utilized herein. As in the previous examples, the flask was equipped with a condenser, a dropping funnel, and continuously flushed with a nitrogen atmosphere. The flask was contained in an ice bath. Sodium hydride, twice washed with hexane and once washed with monoglyme (.11 mole) was placed in the flask along with 100 ml. of monoglyme solvent. The solution was stirred for several seconds and methyl isocyano acetate (.101 mole which corresponds to 10 grams) was added dropwise at a temperature of 0° C. The reaction mixture was continuously stirred until the evolution of hydrogen gas ceased. This was approximately 1 hour. Thereafter isopropyl bromide (.106 mole which is 13.03 grams) was added dropwise and it was noted that a slight amount of gas began evolving. After about 1 hour the reaction mixture was filtered, washed with ether and thereafter the liquid was evaporated. The residue was taken up in chloroform and refiltered and subsequently evaporated. Infrared analysis of the residue showed the presence of valine ethyl ester isocyanide. The amount of product obtained was calculated and found to be 19.5% of the theoretical amount. Subsequent mineral acid hydrolysis as in Example 1 yields valine.

EXAMPLE 4

Preparation of phenylalanine from methyl isocyano acetate and benzyl chloride utilizing sodium hydride as the strongly basic metalating agent The same reaction vessel equipped with the same specialty equipment as utilized in the previous examples was utilized herein. The flask was maintained in an isopropanol Dry Ice cooling bath, 1.69 grams of a mineral oil sodium hydride mixture was obtained and thereafter washed twice with hexane which was decanted. The clean sodium hydride was covered with monoglyme and placed in the flask which was kept under a nitrogen blanket. The amount of sodium hydride utilized was 1.017 grams which corresponds to .0424 mole. Thereafter 4 grams (.04 mole) of methyl isocyano acetate ester was weighed into a flask and dissolved in 25 ml. of monoglyme solvent, after which it was syringed into the addition funnel and added dropwise to the sodium hydride monoglyme solvent mixture. The temperature of the reaction flask was lowered to −40° C. with the Dry Ice-isopropanol bath. The methyl isocyano acetate ester was dropped slowly over 30 minutes into the dispersion of sodium hydride in monoglyme which was continuously being stirred by a magnetic stirring device. Immediately after the addition of the methyl isocyano acetate ester, evolution of hydrogen gas began.

After all of the hydrogen gas had stopped evolving, which was approximately 4 hours, 5 ml. of benzyl chloride (5.37 grams which corresponds to .042 mole) was dropped slowly into the reaction vessel.

The reaction vessel was allowed to continuously stir and was maintained at −40° C. for 2 hours, after which 5 ml. of water and 5 ml. of a 20% hydrochloric acid solution was added along with continuous stirring to induce hydrolyzation of the α-substituted methyl isocyano acetate ester. Hydrolysis was allowed to continue for approximately 48 hours.

Thereafter the mixture was filtered and the residue was taken up in water and the pH was adjusted to 5.5 by the addition of sodium hydroxide. Again the mixture was filtered and the filtrate was evaporated to dryness. Thin layer chromatography on the residue indicated the presence of phenylalanine.

Both the precipitate and the residue were rehydrolyzed separately in excess 20% hydrochloric acid at 110° C. for 2 hours. Thin layer chromatography showed that the rehydrolyzed residue contained small amounts of phenylalanine. The amount of phenylalanine obtained on a percentage basis was not calculated.

EXAMPLE 5

Preparation of n-valine from methyl isocyano acetate and n-propyl bromide utilizing sodium hydride as the strongly basic metalating agent The same reaction vessel equipped with the same specialty equipment as utilized in the previous examples was utilized herein. The flask was maintained in an isopropanol Dry Ice cooling bath. 2.21 grams of a mineral oil sodium hydride mixture was obtained and washed twice with hexane which was decanted. The clean sodium hydride was covered with 100 ml. of monoglyme and placed in the flask which was kept under a nitrogen blanket. The amount of sodium hydride utilized was 1.33 grams, which corresponds to 0.055 mole. Thereafter 5 grams of methyl isocyano acetate ester was weighed into a beaker and dissolved in 50 ml. of monoglyme and added dropwise to the continuously stirring sodium hydride monoglyme dispersion. Evolution of hydrogen gas began immediately. The temperature of the reaction flask was lowered to −40° C. with the Dry Ice isopropanol bath, 5 ml. (0.0505 mole) of n-propyl bromide was added dropwise to the reaction mixture, and the reaction was allowed to continue overnight under an argon blanket.

The next morning the reaction mixture was filtered and washed with chloroform and the filtrate was evaporated down. The residue was thereafter taken up in chloroform and refiltered, and again the filtrate was evaporated down. The weight of the residue was 5.2 grams, which corresponds to approximately 75% of the theoretical yield of α-substituted isocyano acetate ester precursor of n-valine.

4.8 grams of the residue was dissolved in approximately 30 ml. of monoglyme and dropped slowly into 25 ml. of 20% hydrochloric acid while continuously stirring and maintaining a temperature of 110° C. Hydrolysis was allowed to continue for 2 hours. Thereafter the reaction mixture was evaporated down and the residue was taken up in water and the pH adjusted to approximately 6, which is the isoelectric point of n-valine. Subsequent thin layer chromatography revealed the presence of n-valine.

EXAMPLE 6

Preparation of alanine from methyl isocyano acetate and methyl iodide utilizing sodium hydride as the strongly basic metalating agent The equipment utilized herein is the same as that used in the previous examples. 1.33 grams, 0.055 mole, of sodium hydride which had been previously twice washed with hexane, was placed in the reaction flask under an argon blanket. The reaction vessel was maintained at temperatures ranging from −35° C. to −45° C. by utilization of an isopropanol Dry Ice bath. 5 grams, 0.0505 mole, of methyl isocyano acetate ester, was weighed and dissolved in 50 ml. of monoglyme and added dropwise to the sodium hydride strongly basic metalating agent. Gas evolution began immediately. After the addition of all the methyl isocyano acetate ester, and after all of the gas had stopped evolving which was approximately 1.5 hours, 5 grams of methyl iodide dissolved in 15 ml. of monoglyme was added slowly dropwise to the reaction vessel.

The reaction vessel was allowed to continuously stir overnight, approximately 12 hours, and in the morning the reaction mixture was filtered and the solvent evaporated off of the filtrate. The residue was taken up in chloroform and refiltered and the solvent again evaporated. The weight of the residue was 5.9 grams, which indicated a nearly quantitative yield of α-substituted (the substitution group being methyl) isocyano acetate ester precursor of alanine.

2.5 grams of the reaction product was dissolved in 15 ml. of monoglyme and added dropwise to 40 ml. of 20% hydrochloric acid while maintaining the temperature at 90° C. Continuous stirring and heating occurred for 2.5 hours. Thereafter the reaction mixture was evaporated to dryness under an aspirator and neutralized to a pH of 7 with sodium hydroxide. Thin layer chromatography indicated the presence of alanine which was also confirmed by nuclear magnetic resonance which indicated that alanine was the predominant organic material present.

Based upon the total weight of alanine-containing residue obtained, the yield of alanine was 66% of theoretical.

EXAMPLE 7

Preparation of other α-amino acids from methyl isocyano acetate ester and the appropriate electrophilic agents utilizing the procedure of Example 1

When the following electrophilic reagents are substituted for acetaldehyde, as utilized in Example 1, the corresponding α-amino acids are obtained upon hydrolysis of the α-substituted isocyano acetate ester: isobutyl bromide, secondary butyl bromide, formaldehyde, 4-amino butyl iodide, 3-hydroxy-4-amino butyl bromide, guanidino propyl iodide, 3-amino propyl bromide, chloroacetic acid, chloroacetamide, 3-chloro propionic acid, 3-chloro propionamide, 1-bromomethyl mercaptan, 2 - bromoethyl methyl sulfide, 4-hydroxy benzyl iodide, 3,5-dibromo-4-hydroxy benzyl iodide, 3,5-diodo-4-hydroxy benzyl bromide, 2,6,3'-triiodo-4-bromomethyl-4'-hydroxy diphenyl ether, 2,6,3',5' - tetraiodo-4-bromomethyl-4'-hydroxy diphenyl ether, 1,3-dibromo propane, 1,3-diiodo-2-hydroxy propane, 4-chloromethyl imidiazole, 5-chloro valeric acid, chloromethyl acetic acid, 3 - chloropropyl amine, n-(3-bromopropyl) urea, decyl bromide, hexadecyl bromide, isoamyl iodide, tertiary-butyl bromide, ethylene oxide, 3-bromo-2-hydroxy propyl amine, 3,4-dihydroxy benzyl bromide, p-methyl benzyl iodide, 5-hydroxy gramine, and 2-pyridyl methyl bromide.

What is claimed is:

1. A process of preparing α-amino acids comprising the steps of:
   (I) reacting an isocyano acetate ester or salt with a metalating agent to form the corresponding α-metalated isocyano acetate ester or salt carbanion;
   (II) reacting said α-metalated isocyano acetate ester or salt carbanion with an organic electrophilic agent to produce the corresponding α-substituted isocyano acetate ester or salt; and
   (III) hydrolyzing said α-substituted isocyano acetate ester or salt to produce an α-amino acid.

2. A process of preparing α-amino acids comprising the steps of:
   (a) reacting an isocyano acetate ester or salt having the structural formula:

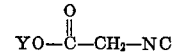

wherein Y is a moiety which is readily removable from the remaining portion of said isocyano acetate by hydrolytic cleavage, with an alkali metal or alkali metal base to form the corresponding α-metalated isocyano acetate ester or salt carbanion;
   (b) reacting said α-metalated isocyano acetate ester or salt carbanion with an organic electrophilic agent selected from the group consisting of methyl halide, isopropyl halide, isobutyl halide, secondary butyl hallide, formaldehyde, acetaldehyde, 4-amino butyl halide, 3-hydroxy-4-amino butyl halide, guanidino propyl halide, haloacetic acid, haloacetamide, 3-halopropionic acid, 3-halopropionamide, halomethyl mercaptan, 2-haloethylmethyl sulfide, benzyl halide, 4-hydroxybenzyl halide, 3,5-dibromo-4-hydroxy benzyl halide, 3,5-diiodo-4-hydroxy benzyl halide, 2,6,3'-triodo-4-halomethyl 4'-hydroxydiphenylether, 2,6,3', 5'-tetraiodo-4-halomethyl 4' - hydroxydiphenylether, 1,3-dihalo propane, 1,3-dihalo-2-hydroxy propane, gramine, 4-halomethyl imidazole, 5-halo valeric acid, α halo α' methyl acetic acid, 3-halo propyl amine, N-(3-halo propyl)urea, propyl halide, decyl halide, hexadecyl halide, isoamyl halide, tert-butyl halide, ethylene oxide, 3-halo-2-hydroxy propyl amine, 3,4-dihydroxybenzyl halide, p-methyl benzyl halide, 5-hydroxy gramine, 2 - pyridyl methyl chloride, and gramine methiodide, to produce the corresponding α-substituted isocyano acetate ester or salt; and
   (c) hydrolyzing said α-substituted isocyano acetate ester or salt to produce the corresponding α-amino acid.

3. The process of claim 1 wherein the strongly basic metalating agent is selected from the group consisting of alkali metal hydrides, alkali metal alkyls wherein the alkyl group is $C_1$ to $C_{12}$ and alkali metal metal alkoxides of the formula BOM wherein M is an alkali metal, and B is a $C_1$ to $C_4$ alkyl group.

4. The process of claim 1 wherein the reactions are conducted in the presence of a non-protic solvent.

5. The process of claim 1 wherein the strongly basic metalating agent and the electrophilic agent are concurrently added to an isocyano acetate ester.

6. The process of claim 1 wherein the α-amino acid is methionine, the electrophilic agent is a 2-haloethylmethyl sulfide.

7. The process of claim 1 wherein the α-amino acid is threonine and the electrophilic agent is acetaldehyde.

8. The process of claim 1 wherein the α-amino acid is lysine and the electrophilic agent is a 4-acetamidobutylhalide.

9. The process of claim 1 wherein the α-amino acid is tryptophan and the electrophilic agent is selected from the group consisting of gramine and a gramine methiodide and the step (III) hydrolysis is a basic hydrolysis.

10. The process of claim 1 wherein α-amino acid is valine and the electrophilic agent is an isopropyl halide.

11. The process of claim 1 wherein the α-amino acid is leucine and the electrophilic agent is an isobutyl halide.

12. The process of claim 1 wherein the α-amino acid is isoleucine and the electrophilic agent is a secondary butyl halide.

13. The process of claim 1 wherein the α-amino acid is phenylalanine and the electrophilic agent is a benzyl halide.

14. The process of claim 1 wherein the step (I) reaction is conducted at a temperature of from −70° C. to 150° C. and the reaction time is from 0.5 to 24 hours.

15. The process of claim 1 wherein step (II) reaction is conducted at a temperature of from −70° C. to 150° C. and the reaction time is from 0.5 to 24 hours.

References Cited

UNITED STATES PATENTS 2,557,041   6/1951   Weisblat et al. __ 260—326.14 X

OTHER REFERENCES

Smith: The Chemistry of Open-Chain Organic Nitrogen Compounds (1965), vol. 1, pp. 225–26.

JOSEPH A. NARCAVAGE, Primary Examiner

U.S. Cl. X.R.

260—309, 376.3, 295 R, 518 R, 518 A, 519, 534 C, 534 E, 534 L, 534 M, 534 S, 534 R, 999